United States Patent
Buettner et al.

(10) Patent No.: US 9,515,397 B2
(45) Date of Patent: Dec. 6, 2016

(54) CONTACT PROTECTION SYSTEM FOR POWER BUSBARS

(71) Applicant: Woehner GmbH & Co. KG Elektrotechnische Systeme, Roedental (DE)

(72) Inventors: Alex Buettner, Roedental (DE); Philipp Steinberger, Roedental (DE); Joram Masel, Kronach (DE); Frank Leistner, Neustadt (DE)

(73) Assignee: WOEHNER GMBH & CO. KG ELEKTROTECHNISCHE SYSTEME, Roedental (DE)

( * ) Notice: Subject to any disclaimer, the term of this patent is extended or adjusted under 35 U.S.C. 154(b) by 0 days.

(21) Appl. No.: 14/513,532

(22) Filed: Oct. 14, 2014

(65) Prior Publication Data

US 2015/0111426 A1    Apr. 23, 2015

(30) Foreign Application Priority Data

Oct. 18, 2013 (EP) .................................... 13189226

(51) Int. Cl.

| | |
|---|---|
| *H01R 9/26* | (2006.01) |
| *H02G 5/00* | (2006.01) |
| *H02B 1/044* | (2006.01) |
| *H02B 1/14* | (2006.01) |
| *H02B 1/20* | (2006.01) |

(Continued)

(52) U.S. Cl.

CPC ............ *H01R 9/2675* (2013.01); *H02B 1/044* (2013.01); *H02B 1/14* (2013.01); *H02B 1/20* (2013.01); *H02G 5/00* (2013.01); *H02G 5/04* (2013.01); *H02H 7/22* (2013.01); *Y10S 439/949* (2013.01)

(58) Field of Classification Search

CPC ...... Y10S 439/949; H02G 5/00; H01R 9/2675
See application file for complete search history.

(56) References Cited

U.S. PATENT DOCUMENTS 3,551,876 A * 12/1970 Walter ................. H01R 9/2675
439/110
4,874,321 A    10/1989 Wagener
(Continued)

FOREIGN PATENT DOCUMENTS

| CN | 1933256 A | 3/2007 |
|---|---|---|
| CN | 202285285 A | 6/2012 |

(Continued)

OTHER PUBLICATIONS

European Patent Office, European Patent Application No. 13189226.7, Office Action dated Feb. 21, 2014, 7 pages.

(Continued)

*Primary Examiner* — James Harvey
(74) *Attorney, Agent, or Firm* — Steven B. Phillips; Moore & Van Allen PLLC

(57) ABSTRACT

Contact protection system for power busbars having planar contact protection modules which each comprise holding feet for engaging behind the power busbars and latching elements for mutually latching with adjacent contact protection module, wherein the contact protection modules comprise for each power busbar a terminal-receiving region for receiving connecting terminals which are provided for electrically contacting the respective power busbar.

18 Claims, 15 Drawing Sheets

(51) Int. Cl.
 *H02G 5/04* (2006.01)
 *H02H 7/22* (2006.01)

(56) References Cited

U.S. PATENT DOCUMENTS

| | | | | |
|---|---|---|---|---|
| 5,064,384 | A * | 11/1991 | Weaver | H01R 9/2675 |
| | | | | 439/511 |
| 5,101,080 | A * | 3/1992 | Ferenc | H02G 5/00 |
| | | | | 174/100 |
| 5,669,788 | A * | 9/1997 | Brockman | H01R 9/2675 |
| | | | | 439/511 |
| 6,106,341 | A * | 8/2000 | Leach, III | H01R 9/2491 |
| | | | | 439/796 |
| 2006/0231285 | A1 * | 10/2006 | Bisson | H01R 4/302 |
| | | | | 174/94 R |
| 2006/0243569 | A1 * | 11/2006 | Buettner | H02B 1/0565 |
| | | | | 200/42.01 |
| 2011/0275237 | A1 * | 11/2011 | Buettner | H01H 85/203 |
| | | | | 439/366 |
| 2012/0142202 | A1 * | 6/2012 | Schalk | H02B 1/056 |
| | | | | 439/114 |
| 2013/0045613 | A1 * | 2/2013 | Griese | H01R 9/2658 |
| | | | | 439/121 |
| 2013/0288530 | A1 * | 10/2013 | Zhao | H01M 2/206 |
| | | | | 439/627 |
| 2015/0111426 | A1 * | 4/2015 | Buettner | H02B 1/044 |
| | | | | 439/607.01 |
| 2015/0244123 | A1 * | 8/2015 | Steinberger | H02B 1/21 |
| | | | | 439/119 |

FOREIGN PATENT DOCUMENTS

| | | |
|---|---|---|
| CN | 202712774 A | 1/2013 |
| DE | 2360260 A1 | 6/1974 |
| DE | 9104212 U1 | 10/1991 |
| EP | 02270994 B1 | 7/1992 |
| EP | 0753916 A2 | 1/1997 |
| EP | 1206019 A2 | 5/2002 |
| EP | 2037550 A1 | 3/2009 |
| ES | 2306572 A1 | 11/2008 |
| GB | 01405226 A | 9/1975 |

OTHER PUBLICATIONS

Chinese Patent Office; Office Action for Chinese Patent Application No. 201410555325.6 dated May 31, 2016. 7 pages.

* cited by examiner

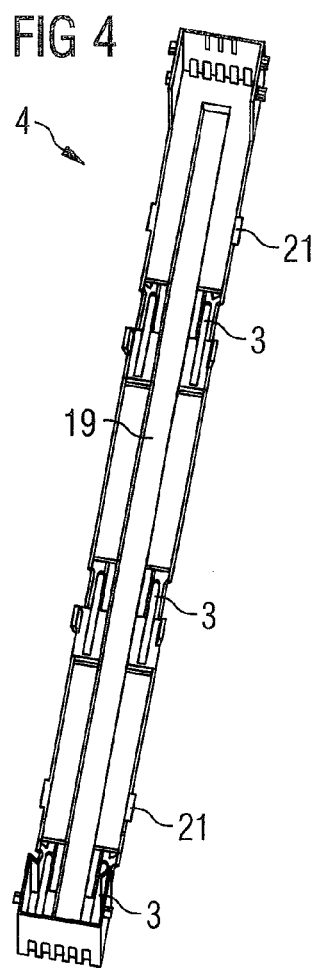
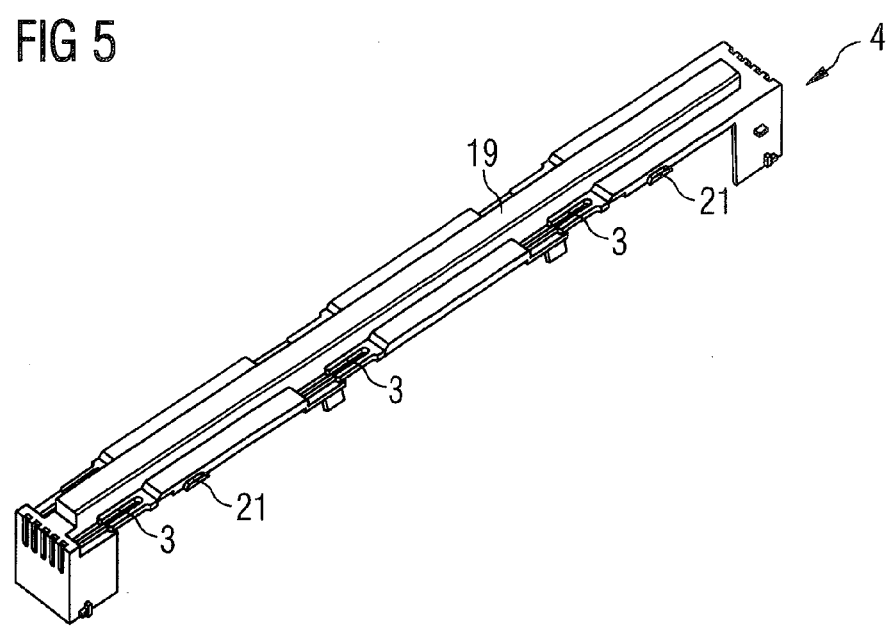

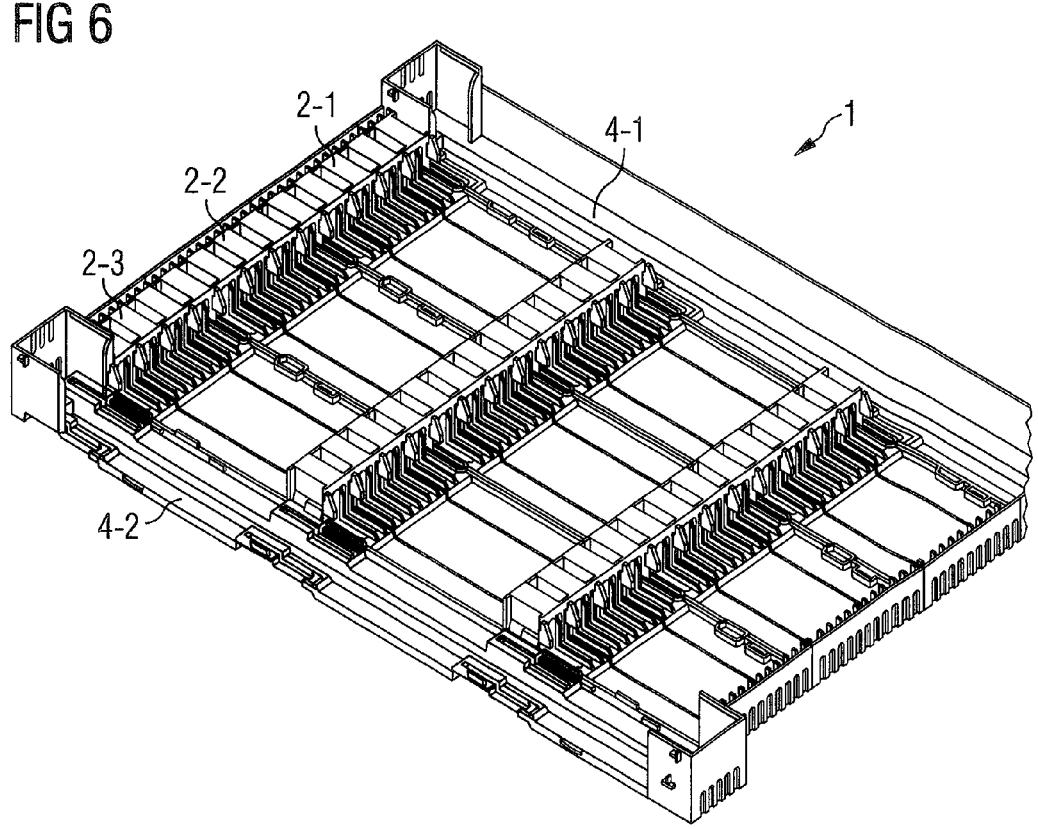

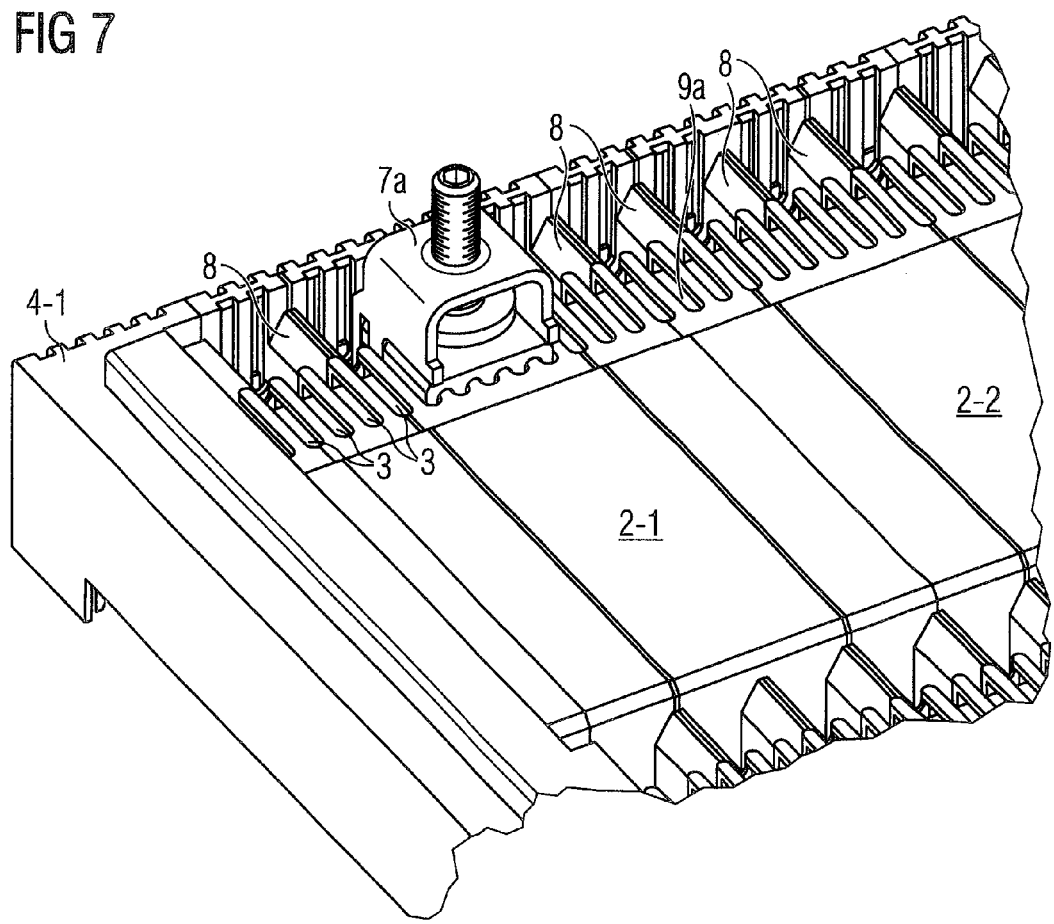

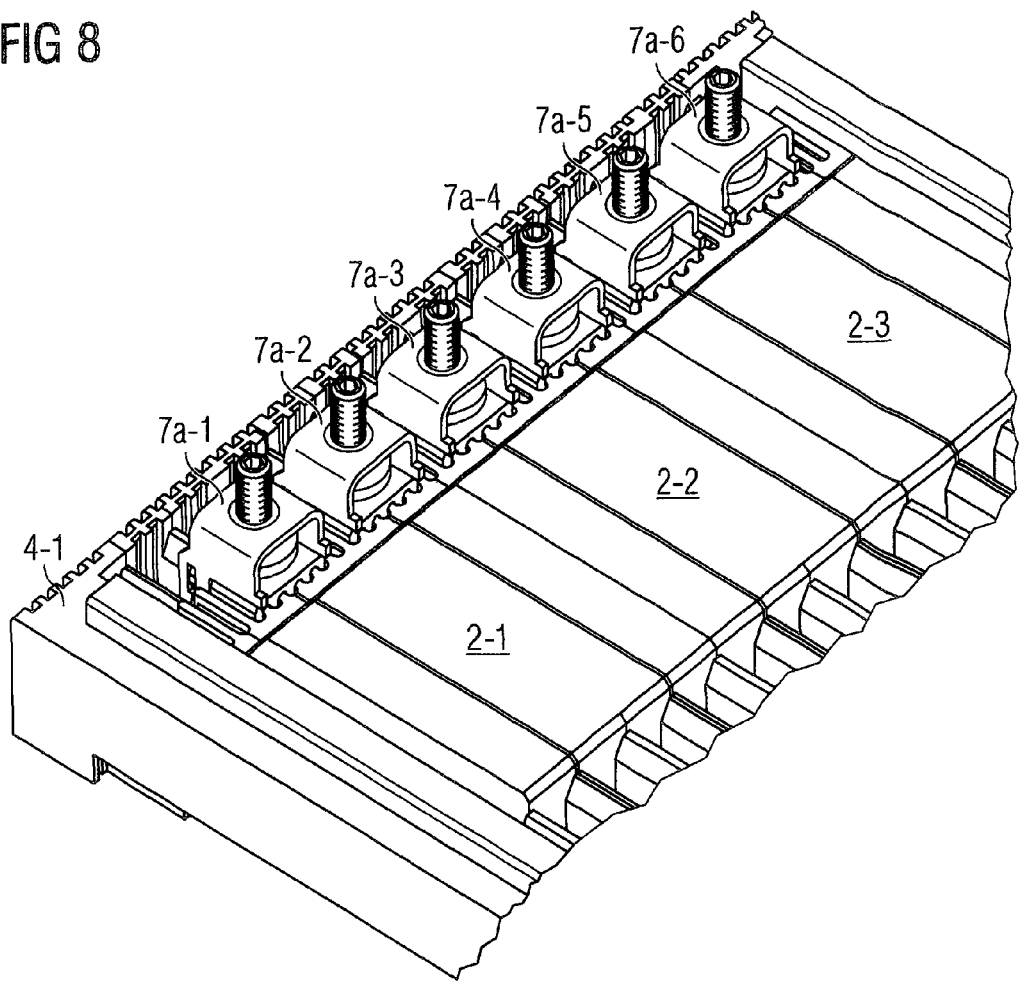

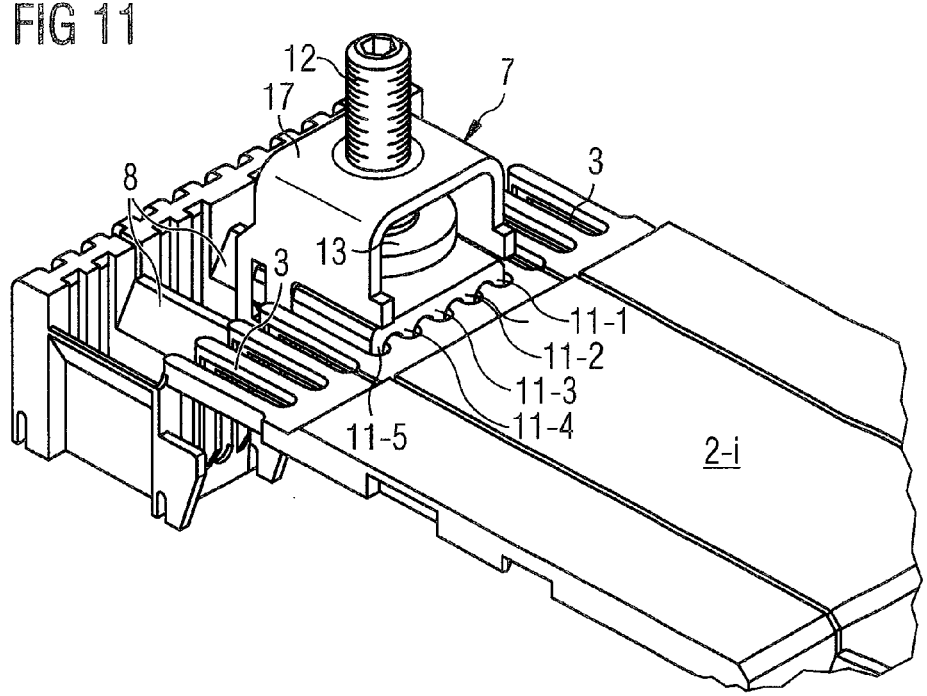
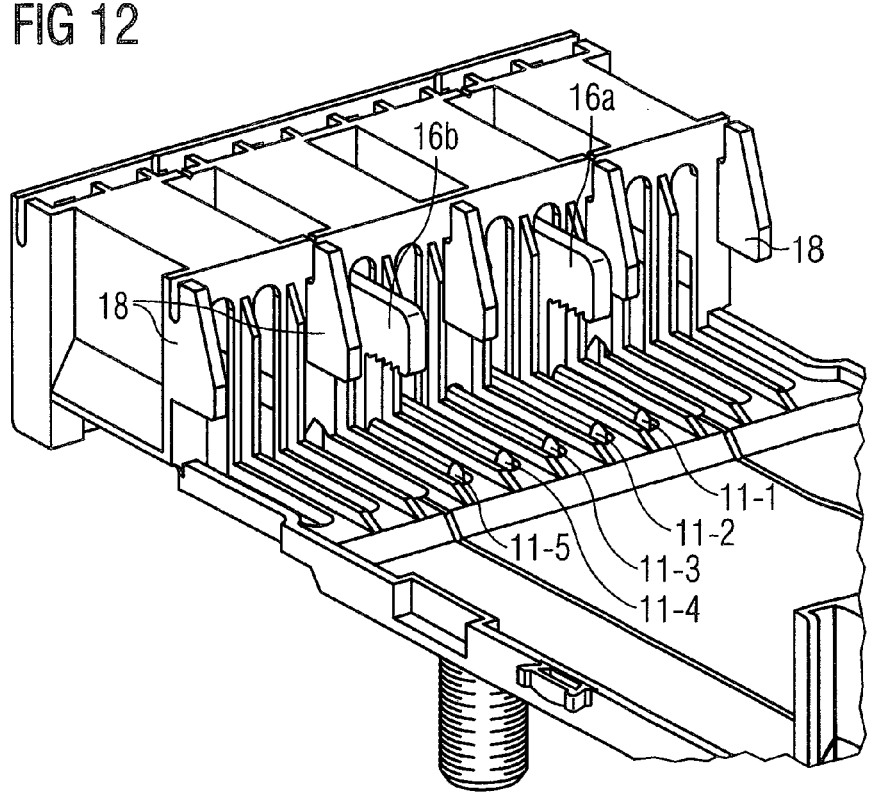

CONTACT PROTECTION SYSTEM FOR POWER BUSBARS

BACKGROUND

The invention relates to a contact protection system for power busbars which serve to supply electric current to switching devices.

Busbars, in particular power busbars, comprise an arrangement of conductors which can be used for distributing electric energy. Busbars are manufactured from aluminium or copper and are generally uninsulated so as to simplify connection and switching elements. Therefore, the contact protection is typically ensured by means of a housing of the switching system.

After the housing is opened, conventional busbars do not offer any contact protection, which means that busbar systems are generally only found in main distribution boards, in which extensive safety measures mean that the access is restricted to correspondingly qualified, electrically skilled personnel.

SUMMARY OF THE INVENTION

One or a plurality of electrical devices, in particular switching devices, can be mounted on the power busbars. In many cases, the accessible power busbars are routed in lockable switch boxes, as the power busbars themselves do not comprise any contact protection. After the switch cabinet has been opened, a qualified person can mount a switching device on, or remove same from, the power busbars after switching off the current which flows through the power busbars.

One disadvantage of these conventional power busbar systems thus resides in the fact that mounting or removal of devices is only possible if the power busbar system is completely switched off. Therefore, in the case of these conventional systems it is not possible to supply current continuously to all of the connected devices, as when a device is replaced current can no longer be supplied to the remaining electrical devices by the power busbar system by reason of the required switch-off procedure. This is a major disadvantage in particular in certain applications, e.g. in the case of current supply systems of hospitals or the like, as in many situations current must always be supplied to certain electrical devices, such as e.g. medical supply devices, which cannot readily be disconnected from the current supply.

A further disadvantage of such conventional power busbar systems resides in the fact that in order to mount or remove a switching device, a user or a qualified person must always open a switch cabinet or the like, e.g. by means of a special tool, in order to be able to mount or remove a switching device.

A further major disadvantage of such conventional power busbar systems resides in the fact that after a switch cabinet has been opened by a user there is no longer any contact protection, in particular if the user forgets to switch the power busbar system to zero potential.

Therefore, it is an object of the present invention to provide a contact protection system for power busbars, which avoids the aforementioned disadvantages and provides the user with reliable contact protection.

In accordance with the invention, this object is achieved by a contact protection system having the features stated in claim 1.

Accordingly, the invention provides a contact protection system for power busbars having planar contact protection modules which each comprise holding feet for engaging behind the power busbars and latching elements for mutually latching with adjacent contact protection modules, wherein the contact protection modules comprise for each power busbar a terminal-receiving region for receiving connecting terminals which are provided for electrically contacting the respective power busbar.

The contact protection system in accordance with the invention thus offers the advantage that after opening a switch cabinet or the like a user is automatically protected against electric shock by means of the contact protection system in accordance with the invention which is mounted on the power busbars.

A further advantage of the contact protection system in accordance with the invention is that it is constructed in a modular manner and the contact protection modules can be mutually latched together in a simple manner. This facilitates assembly of the contact protection system.

A further advantage of the contact protection system in accordance with the invention resides in the fact that connecting terminals of any electrical devices can be introduced in a simple manner into the terminal-receiving regions of the contact protection modules and can be embedded in an insulating manner such that additional insulation is effected between the power busbars.

In the case of one possible embodiment of the contact protection system in accordance with the invention, the terminal-receiving regions of the contact protection modules each comprise contacting slots, which are arranged in parallel, for electrically contacting the power busbars by means of the connecting terminals.

The contacting slots which are arranged in parallel are preferably formed in geometric terms so as to achieve protection class IP20 and therefore any direct contact between a power busbar and a user's finger is precluded by the contacting slots is precluded.

In the case of a further possible embodiment of the contact protection system in accordance with the invention, the contacting slots of the terminal-receiving regions on the holding feet are arranged opposite thereto for engaging behind the power busbars.

In the case of a further possible embodiment of the contact protection system in accordance with the invention, the contacting slots of the contact protection modules are formed in such a manner that they provide a uniform division of all mutually latched contact protection modules.

Therefore, it is possible to mount a device at any point on the power busbars.

In the case of a further possible embodiment of the contact protection system in accordance with the invention, the terminal-receiving regions of the contact protection modules comprise insertion devices, which are sloped in the manner of a roof, for inserting clamping brackets of the connecting terminals which are provided for fixedly clamping the connecting terminals to the power busbars.

This embodiment offers the advantage that the connecting terminals can be inserted into the insertion devices in a very simple manner by a fitter, without the fitter having to concentrate too much on this. By means of the insertion devices, the connecting terminals are guided directly to the suitable position for placement onto the contacting slots.

In the case of a further possible embodiment of the contact protection system in accordance with the invention, the connecting terminals are each connected to a switching device which draws electric current from the power busbars.

In the case of a further possible embodiment of the contact protection system in accordance with the invention, each connecting terminal comprises a contact plate having contact segments which are arranged in parallel and electrically contact, through the contacting slots of a contact protection module, a power busbar located underneath.

In the case of a further embodiment of the contact protection system in accordance with the invention, the contact plate of the connecting terminal is guided by two opposite guide grooves which are provided in opposite clamping brackets of the connecting terminal.

In the case of a further possible embodiment of the contact protection system in accordance with the invention, the contact plate of the connecting terminal is pressed against the power busbar by means of a screw and a spring disk.

In the case of a further possible embodiment of the contact protection system in accordance with the invention, a connection rail or a connecting plate can be clamped between the spring disk and the contact plate of the connecting terminal.

In the case of a further possible embodiment of the contact protection system in accordance with the invention, at least one prism clamp for a circular or sector-shaped conductor or a ribbon cable is attached to the connecting plate.

In the case of a further possible embodiment of the contact protection system in accordance with the invention, busbar carrier cover modules are provided for covering power busbar carriers, wherein the busbar carrier cover modules can be latched to adjacent contact protection modules by means of latching elements.

This embodiment offers the advantage that reliable coverage and corresponding contact protection are ensured even in the region of the power busbar carriers.

In the case of a further possible embodiment of the contact protection system in accordance with the invention, the contact protection modules can be slid on a plurality of power busbars, which are arranged in parallel in the horizontal direction, such that the holding feet of the contact protection modules engage behind the power busbars.

This offers the advantage that the contact protection modules can be attached to the power busbars in a particularly simple and convenient manner.

In the case of a further possible embodiment of the contact protection system in accordance with the invention, an edge profile can be inserted at a lower edge of the contact protection modules, which are slid onto the power busbars and are latched to one another, said edge profile can be latched in a non-positive-locking manner to busbar carrier cover modules and therefore the contact protection modules are prevented from inadvertently sliding down from the power busbars.

In the case of a further possible embodiment of the contact protection system in accordance with the invention, the contact protection modules can be covered and/or closed by means of an additional, completely closed cover.

This ensures 100% contact protection on the front side.

In the case of a further possible embodiment of the contact protection system in accordance with the invention, each contact protection module of the contact protection system comprises for each power busbar to be covered in each case a plurality of holding feet for engaging behind the respective power busbar, wherein a cover device for increasing fault arc resistance can be attached to adjacent chambers of the contact protection modules.

In the case of a further possible embodiment of the contact protection system in accordance with the invention, the contact protection modules, the busbar carrier cover modules and the edge profiles of the contact protection system consist of an electrically insulating, thermally stable synthetic material which is self-extinguishing in the event of a fire.

On the one hand, this offers the advantage that the modules of the contact protection system are lightweight and thus simple to transport and assemble. Furthermore, the modules of the contact protection system ensure reliable protection against arc effects of switching devices seated thereon and adjacent thereto.

DESCRIPTION OF THE DRAWINGS

Possible embodiments of the contact protection system in accordance with the invention will be explained in greater detail hereinafter with reference to the attached figures, in which:

FIG. 4, 5 show perspective views of an exemplified embodiment of a busbar carrier cover module used in the contact protection system in accordance with the invention;

FIG. 6 shows a rear perspective view of a plurality of mutually latched contact protection modules of the contact protection system in accordance with the invention;

FIG. 7 shows a perspective view to illustrate a connecting terminal which is attached to a power busbar in the contact protection system in accordance with the invention;

FIG. 8 shows a perspective view of a plurality of connecting terminals mounted on a power busbar;

FIG. 11, 12 show detailed views to illustrate the mounting of a connecting terminal which contacts a power busbar through contact slots of a contact protection module in accordance with the invention;

DETAILED DESCRIPTION OF EMBODIMENTS

Figure 1:
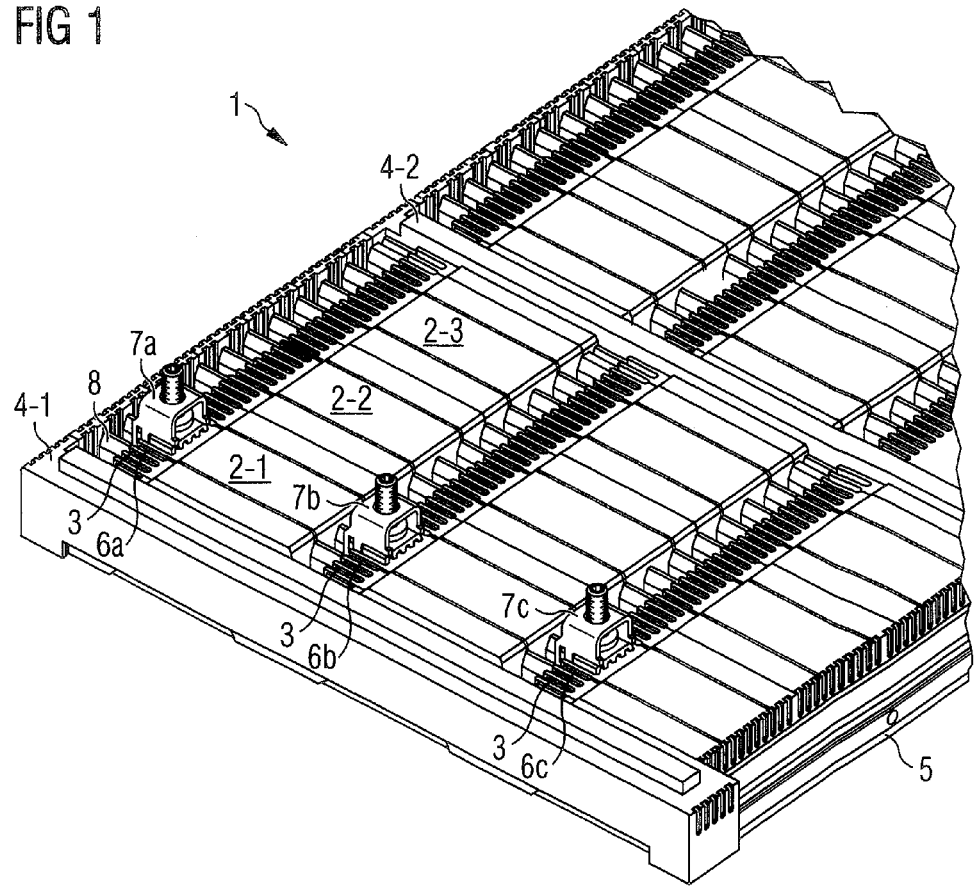
FIG. 1 shows an oblique perspective view from above of an exemplified embodiment of a contact protection system in accordance with the invention.

As can be seen in FIG. 1, the inventive contact protection system 1 for power busbars 9 is constructed in a modular manner. A plurality of contact protection modules 2, which each comprise holding feet for engaging behind the power busbars 9, are mutually latched to adjacent contact protection modules 2 with the aid of latching elements and cover the power busbars 9 (not visible in FIG. 1) in a planar manner. The planar contact protection modules 2 illustrated in FIG. 1 can be attached to, or slid onto, the power busbars 9 preferably with the aid of the holding feet. Therefore, the contact protection modules 2 can be attached to the power busbars 9 in a simple manner. Each of the contact protection modules 2-*i* comprises for each power busbar 9 a terminal-receiving region 6 for receiving connecting terminals 7, wherein the connecting terminals 7 are provided for electrically contacting the power busbars 9 located underneath the contact protection modules 2. In the case of the exemplified embodiment illustrated in FIG. 1, the contact protection module 1 is provided for three power busbars 9*a*, 9*b*, 9*c* which extend in parallel. Accordingly, each contact protection module 2-*i* comprises three terminal-receiving regions 6*a*, 6*b*, 6*c* for receiving connecting terminals 7 which are provided for electrically contacting the respective power busbar 9*a*, 9*b*, 9*c*. In the case of the exemplified embodiment illustrated in FIG. 1, the power busbars (not visible in FIG. 1) are held e.g. against a wall by means of power busbar carriers. In the case of the exemplified embodiment illustrated in FIG. 1, these power busbar carriers are covered by means of busbar carrier cover modules 4-1, 4-2, in order to provide contact protection for the user also in this region. In the illustrated exemplified embodiment, three contact protection modules 2-1, 2-2, 2-3 which are attached next to one another are located between the busbar carrier cover modules 4-1, 4-2. The different modules 2-*i* of the protections 1 are latched to one another with the aid of latching components. The contact protection modules 2-1, 2-2 are latched to one another and furthermore the busbar carrier cover modules 4-1, 4-2 are also latched to two adjacent contact protection modules 2 in each case by means of latching elements. For example, in FIG. 1 the busbar carrier cover module 4-1 is latched to the contact protection module 2-1 arranged next to it on the right-hand side.

The contact protection modules 2-*i* can be slid onto a plurality of power busbars 9, which are arranged in parallel in the horizontal direction, such that the holding feet of the contact protection modules 2-*i* engage behind the power busbars 9. In the case of the exemplified embodiment illustrated in FIG. 1, the contact protection modules 2-*i* are slid on in three power busbars 9*a*, 9*b*, 9*c* (not visible) arranged in parallel in the horizontal direction, so that the holding feet of the contact protection modules 2 engage behind the three power busbars 9*a*, 9*b*, 9*c*. As can also be seen in FIG. 1, an edge profile 5 is attached to a lower edge of the contact protection modules 2-*i* which are slid onto the power busbars 9 and are latched to one another. Furthermore, this edge profile 5 is latched to the busbar carrier cover modules 4-1, 4-2 in a non-positive-locking manner and in this manner prevents the contact protection modules 2-*i* from inadvertently sliding down from the power busbars 9 located underneath.

In the case of the exemplified embodiment illustrated in FIG. 1, each contact protection module 2-*i* comprises a number of terminal-receiving regions which corresponds to a number of power busbars 9. In the case of the exemplified embodiment illustrated in FIG. 1, in each case three terminal-receiving regions 6*a*, 6*b*, 6*c* are provided for three parallel-extending power busbars 9 on the contact protection modules 2-*i*. The terminal-receiving regions 6*a*, 6*b*, 6*c* comprise in each case contact slots 3 arranged in parallel, as illustrated in FIGS. 1 and 11. These contact slots 3 are used for electrically contacting the power busbars 9 located underneath by means of connecting terminals 7. In the case of the exemplified embodiment illustrated in FIG. 1, three contacting terminals 7*a*, 7*b*, 7*c* are shown. The first contacting terminal 7*a* is mounted in the region of the first terminal-receiving region 6*a* for electrically contacting a power busbar 9*a* located underneath. In a similar manner, the connecting terminals 7*b*, 7*c* are attached in connecting terminal regions 6*b*, 6*c* of the contact protection module 2-*i*, in order to electrically contact corresponding power busbars 9*b*, 9*c* located underneath.

As can be seen in FIG. 1, the contacting slots of the contact protection modules 2-*i* are formed in such a manner that they provide a uniform division of all mutually latched contact protection modules 2. In the case of one possible embodiment, the division is 50:6=8.33 mm, thus enabling contacting at any point. With this division of slots of 8.33 mm it is possible to electrically connect all electrical devices present in a 185 mm-system, in particular NH fuse switches and connecting blocks (GR00-3), to the power busbars 9. In the case of the exemplified embodiment illustrated in FIG. 1, the contact protection system 1 is suitable for three power busbars 9*a*, 9*b*, 9*c* which are arranged in parallel and provide e.g. different electrical phases L1, L2, L3 for an electrical device.

As can be seen in FIG. 1, the terminal-connecting regions 6*a*, 6*b*, 6*c* comprise insertion devices 8 which are sloped in the manner of a roof. These insertion devices 8 sloped in the manner of a roof are used for inserting clamping brackets of the connecting terminals 7 which are provided for fixedly clamping the connecting terminals 7 to the power busbars 9. The connecting terminals 7*a*, 7*b*, 7*c* illustrated in FIG. 1 can be connected to an associated switching device which draws electric current from the power busbars 9. The modules of the contact protection system 1 illustrated in FIG. 1, i.e. the contact protection modules 2-*i*, the busbar carrier cover modules 4-*i* and the edge profiles 5 consist preferably of an electrically insulating, thermally stable and fire-retarding material. With the aid of the connecting terminals 7, any switching devices or assemblies can be clamped onto the power busbars 9 and contacted therewith.

Figure 2:
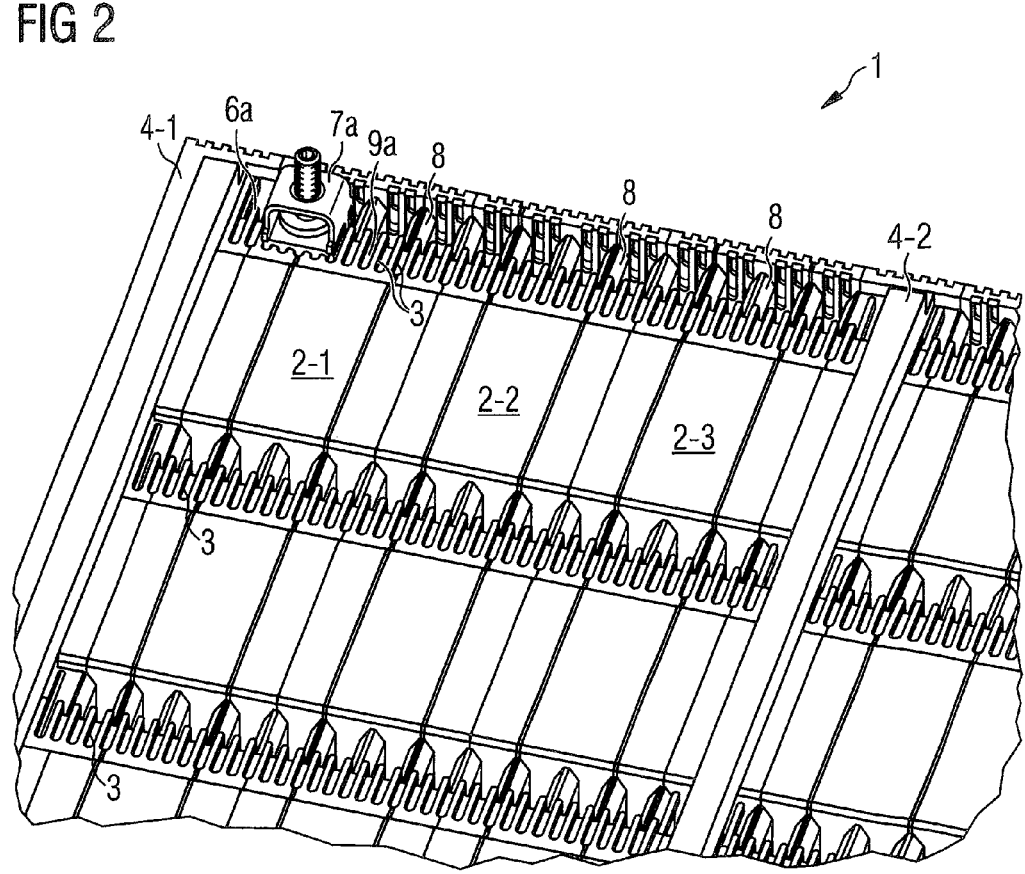
FIG. 2 shows a further perspective view of an exemplified embodiment of a contact protection system in accordance with the invention.

FIG. 2 illustrates a further perspective view of a contact protection system 1 in accordance with the invention. FIG. 2 shows a connecting terminal 7*a* mounted in a terminal-connecting region 6*a* for electrically contacting a power busbar 9*a* located underneath. The contacting slots 3 which are arranged in parallel at least partially cover in a comb-shaped manner the power busbar 9*a* located underneath, as can be seen in FIG. 2. Located next to the contacting slots 3 are the insertion devices 8 which are sloped in the manner of a roof and facilitate insertion of clamping brackets of the connecting terminals 7 into the terminal-receiving region 6*a*. In the case of the exemplified embodiment illustrated in FIG. 2, the contacting slots 3 cover an edge region of the power busbar 9*a*, located underneath, in a similar manner to a comb. The length of the contacting slots 3 and the width thereof can vary in dependence upon how much current is to be transferred to the device, which is to be connected, via the connecting terminal 7. The geometric shape of the contacting slots 3 ensures in each case that the power busbar 9 located underneath cannot be contacted by a user's fingers.

Figure 3:
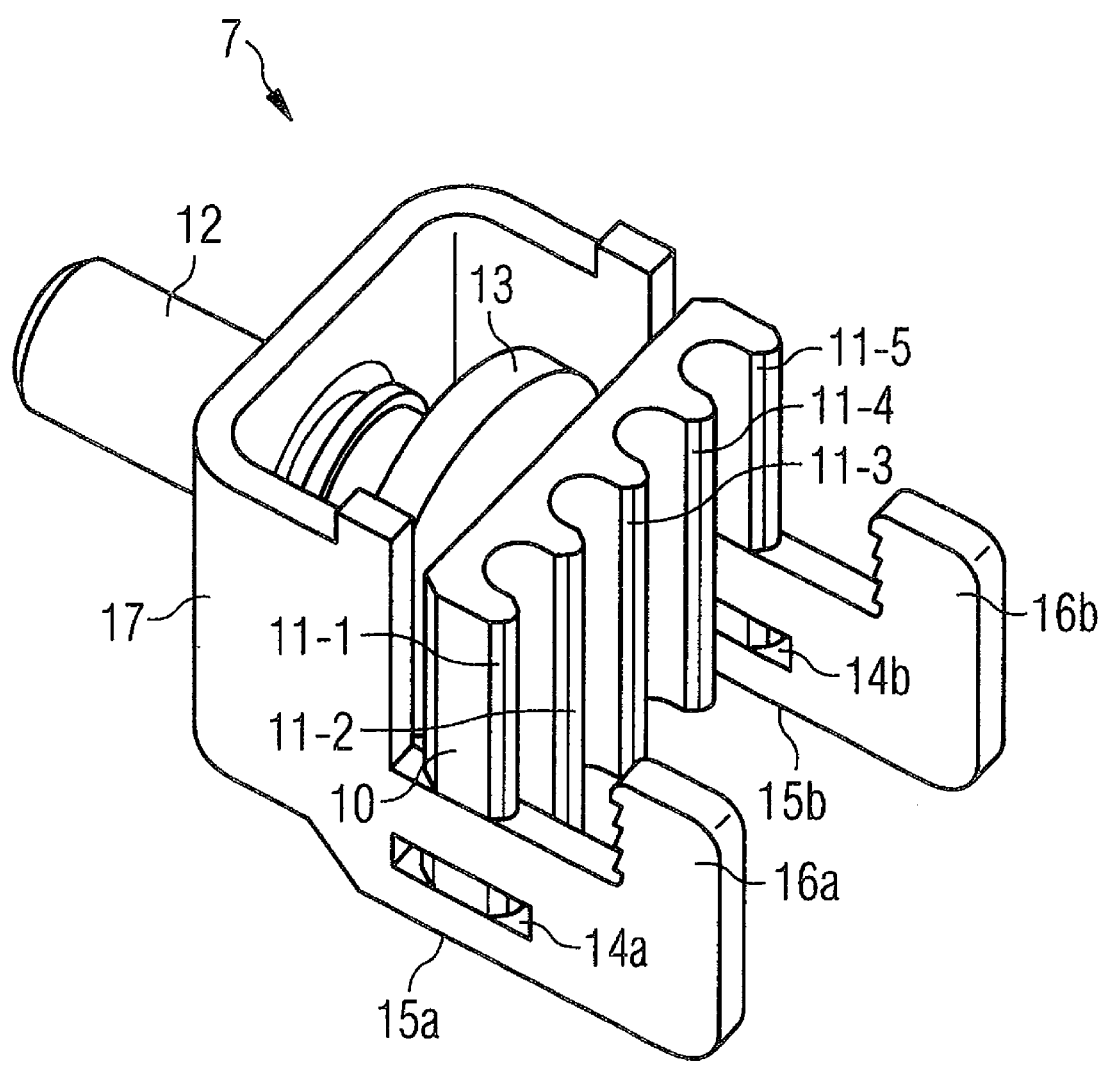
FIG. 3 shows a connecting terminal which can be attached to the contact protection system in accordance with the invention.

FIG. 3 illustrates a perspective view of an exemplified embodiment of a connecting terminal 7, as can be used in the case of the contact protection system 1 in accordance with the invention. The connecting terminal 7 comprises a contact plate 10. The contact plate 10 includes contact segments 11-1, 11-2, 11-3, 11-4, 11-5 which are arranged in parallel. In the illustrated exemplified embodiment, the contact plate 10 includes five contact segments. The number of contact segments of the contact plate 10 can vary. The contact segments of the contact plate 10 have a height of several millimeters, e.g. 6 to 8 mm. The spaced interval between the apexes of the contact segments 11-i corresponds to a specified division of e.g. 50:6=8.33 mm. The contact segments 11-i illustrated in FIG. 3 are suitable for electrically contacting, through the contacting slots 3 of the contact protection module 2, a power busbar 9 located underneath. The contact plate 10 consists of an electrically conductive material. The contact plate 10 of the connecting terminal 7 is pressed or urged against a power busbar 9 by means of a clamping screw 12 and a spring disk 13. In the case of the exemplified embodiment illustrated in FIG. 3, the contacting plate 10 of the connecting terminal 7 is guided by two opposite guide grooves 14a, 14b which are provided in the opposite clamping brackets 15a, 15b. The clamping brackets 15a, 15b are substantially L-shaped and comprise front clamping hooks 16a, 16b which are suitable for engaging behind busbars, in particular power busbars 9. In the exemplified embodiment illustrated in FIG. 3, the clamping hooks 16a, 16b of the clamping brackets 15a, 15b comprise an undulating or rough profile for engaging behind the power busbars 9. In the mounted state, the respective power busbar 9 is located between the contact plate 10 and the clamping hooks 16a, 16b. The two clamping brackets 15a, 15b are connected to one another by means of a U-shaped base profile 17. This U-shaped base profile comprises an opening, through which the clamping screw 12 is connected to the spring disk 13.

FIGS. 4 and 5 illustrate perspective views of an exemplified embodiment of a busbar carrier cover module 4 used in the contact protection system 1 in accordance with the invention. As can be seen in FIGS. 4, 5, the busbar carrier cover module 4 comprises a web 19, wherein in the illustrated exemplified embodiment a contacting slot 3 is provided for the different power busbars 9 in each case laterally on the web 19. FIGS. 4, 5 also show laterally attached latching components 21 for latching the power busbar cover module 4 to adjacent contact protection modules 2.

FIG. 6 illustrates a perspective view from below of a contact protection system 1 in accordance with the invention, i.e. from the point of view of the power busbars (not illustrated therein). It can be seen in FIG. 6 that the contact protection modules 2 each comprise three receiving chambers for the different power busbars 9a, 9b, 9c.

FIG. 7 illustrates a perspective detailed view of a connecting terminal 7 which is mounted on a power busbar 9a. FIG. 7 shows the insertion devices 8, which are sloped in the manner of a roof in the terminal-receiving region 6 of the contact protection modules 2, for inserting the clamping brackets 15a, 15b of the connecting terminals 7. When a connecting terminal 7 is attached, the connecting terminal 7 is moved by the insertion devices 8, which are sloped in the manner of a roof, automatically to the correct position for mounting on the power busbar 9a located underneath. The contacting slots 3 inside the terminal-receiving regions 6 are used not only for contacting the power busbar 9 located underneath, but can also be provided in addition for cooling purposes, in particular if the number of connecting terminals 7 mounted at the power busbars 9 is relatively small, as illustrated in FIG. 7.

In the case of the exemplified embodiment illustrated in FIG. 8, a multiplicity of connecting terminals 7a-1 to 7a-6 are mounted on the same power busbar 9a, so that all of the contacting slots are occupied by the segments 11 of the contact plates 10.

Figure 9:
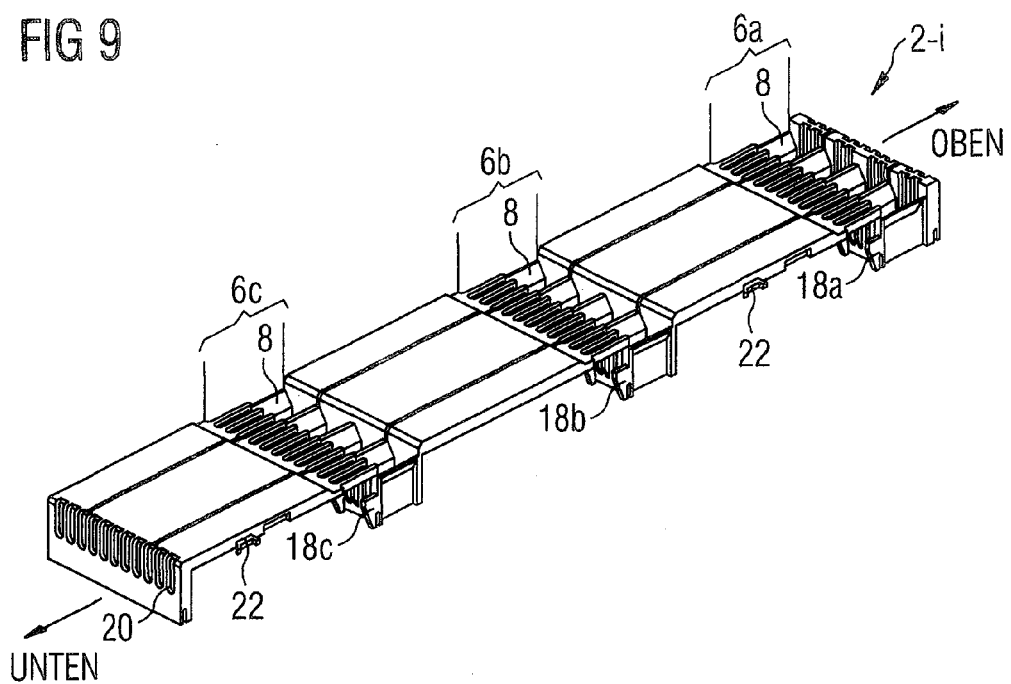
FIG. 9, 10 show side perspective views from above and below of an exemplified embodiment of a contact protection module used in the contact protection system in accordance with the invention.
Figure 10:
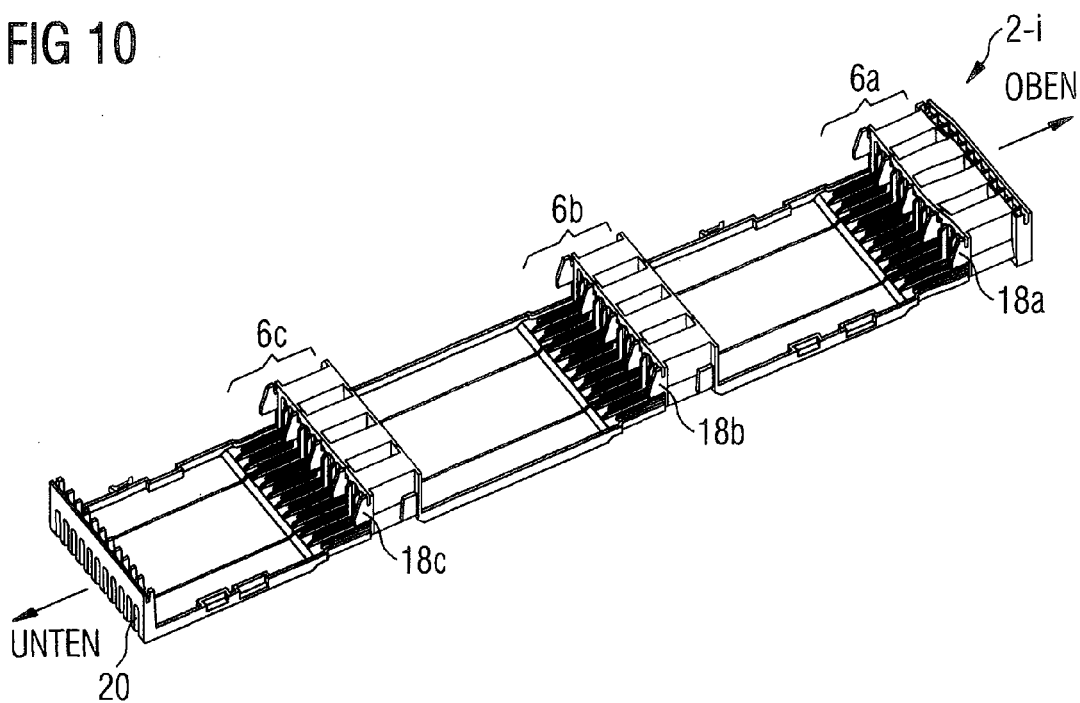

FIGS. 9, 10 illustrate perspective views of an exemplified embodiment of a contact protection module 2-i. FIG. 9 shows a view of a contact protection module 2 obliquely from above and FIG. 10 shows a view of the same contact protection module 2 obliquely from below. As can be seen in FIGS. 9, 10, the contact protection module 2 comprises three rows of holding feet 18a, 18b, 18c which are suitable for engaging behind an associated power busbar 9a, 9b, 9c. FIGS. 9, 10 also show the terminal-receiving regions 6a, 6b, 6c of the contact protection module 2 illustrated in FIGS. 9, 10. The terminal-receiving regions 6a, 6b, 6c of the contact protection module 2 have in each case contacting slots, which are arranged in parallel, for electrically contacting the associated power busbar 9a, 9b, 9c by means of connecting terminals 7. The contacting slots 3 of the terminal-receiving regions 6a, 6b, 6c are provided in the region of the holding feet 18 for engaging behind the power busbars 9, wherein they are arranged preferably opposite the holding feet 18. Furthermore, the insertion devices 8, which are sloped in the manner of a roof, for inserting clamping brackets 15a, 15b of the connecting terminals 7 are provided in the terminal-receiving regions 6a, 6b, 6c of the contact protection module 2, as can be clearly seen in FIG. 9. When a contact protection module 2 is attached, as illustrated in FIGS. 9, 10, the rows of holding feet 18a, 18b, 18c are slid from above onto parallel-extending power busbars 9a, 9b, 9c. FIGS. 9, 10 also show latching components 22 which are provided for latching with adjacent modules of the contact protection system 1. In the case of the exemplified embodiment illustrated in FIGS. 9, 10, the latching elements 22 each comprise a latching protrusion and an adjacent latching recess, so that the modules can be latched to one another in a simple manner.

FIGS. 11, 12 illustrate detailed views of the mounting of a connecting terminal 7 on a contact protection module 2. FIG. 11 shows a view obliquely from above, whereas FIG. 12 shows a detailed view obliquely from below. The detailed view of FIG. 12 shows the holding feet 18 of the contact protection module 2 and the contacting segments 11 of the contact plate 10 of the connecting terminal 7 which protrude through the contacting slots 3. Also shown are the forwardly protruding apexes of the clamping brackets 15a, 15b or the clamping hooks 16a, 16b of the connecting terminal 7. As can be seen in FIG. 12, the contacting segments 11-i of the contact plate 10 protrude through the contacting slots 3, so that they electrically contact the power busbar 9 (not illustrated in FIG. 12) located underneath. In order to ensure that the connecting terminals 7 meet exactly vertically in the correct slots 3, the contact protection modules 2 are provided with insertion aids 8 which are sloped in the manner of a roof. Any switching devices or assemblies can be clamped to the power busbars 9 by means of the connecting terminals 7.

Figure 13:
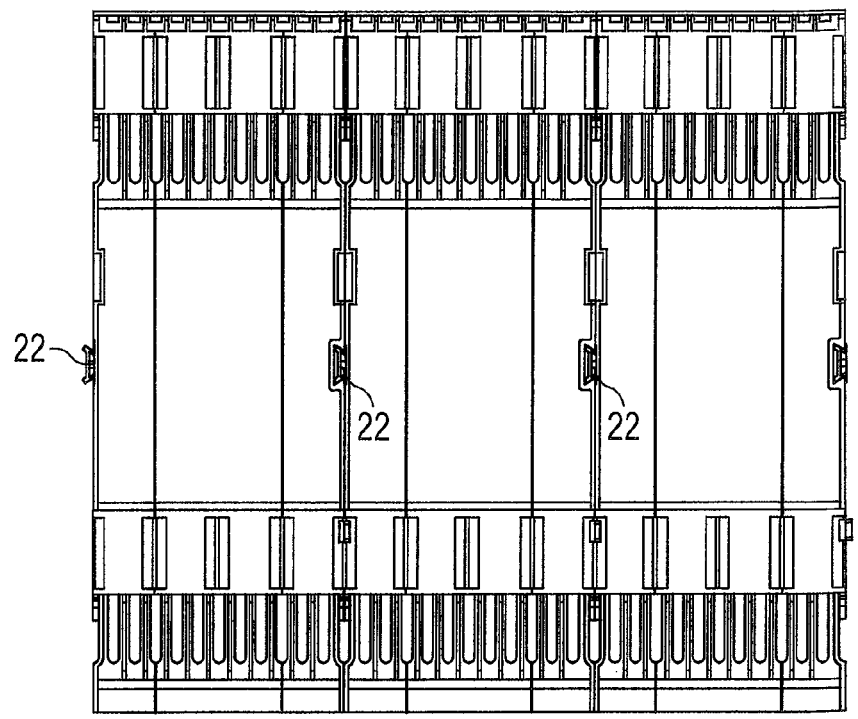
FIG. 13, 14 show further views to illustrate a latching connection between different modules of the contact protection system in accordance with the invention.
Figure 14:
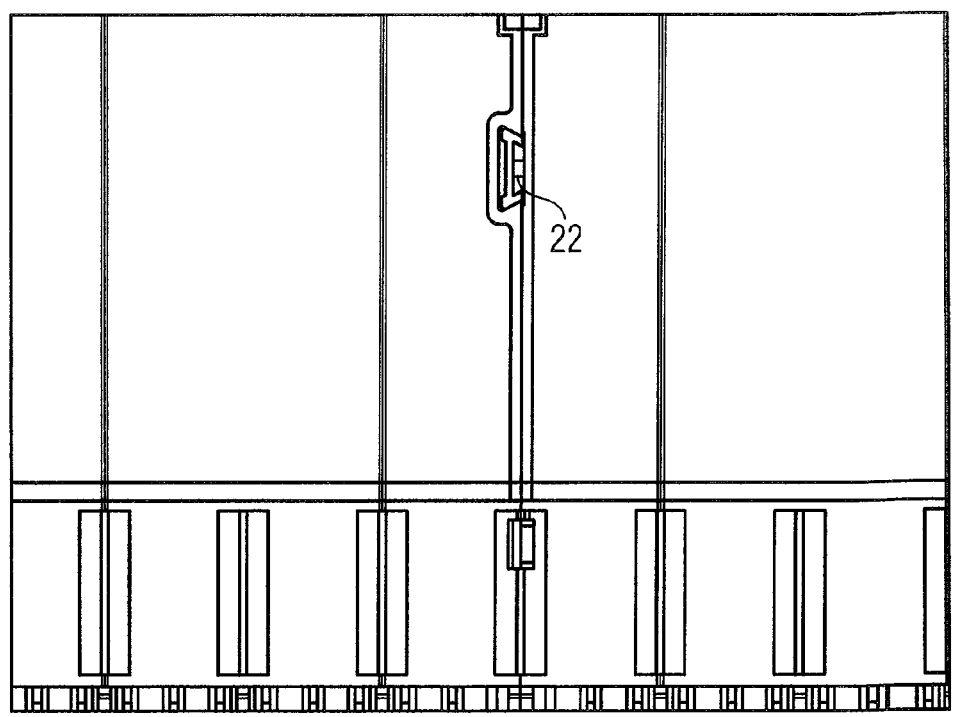

FIGS. 13, 14 illustrate the latching of the different contact protection modules 2 with adjacent contact protection modules 2 in an exemplified embodiment of the contact protection system 1 in accordance with the invention.

Figure 15A:
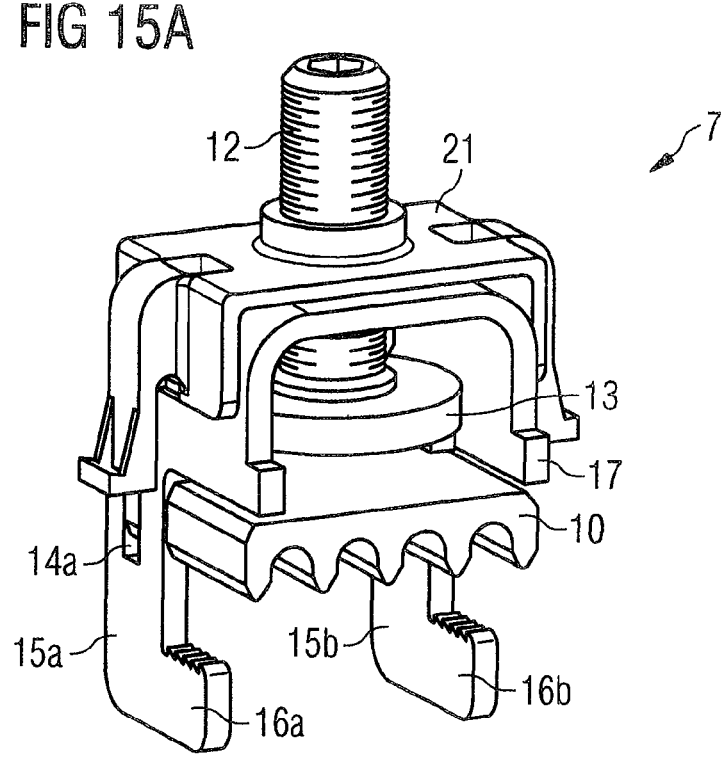
FIG. 15A, 15B show views of a connecting terminal which can be used in the contact protection system in accordance with the invention.
Figure 15B:
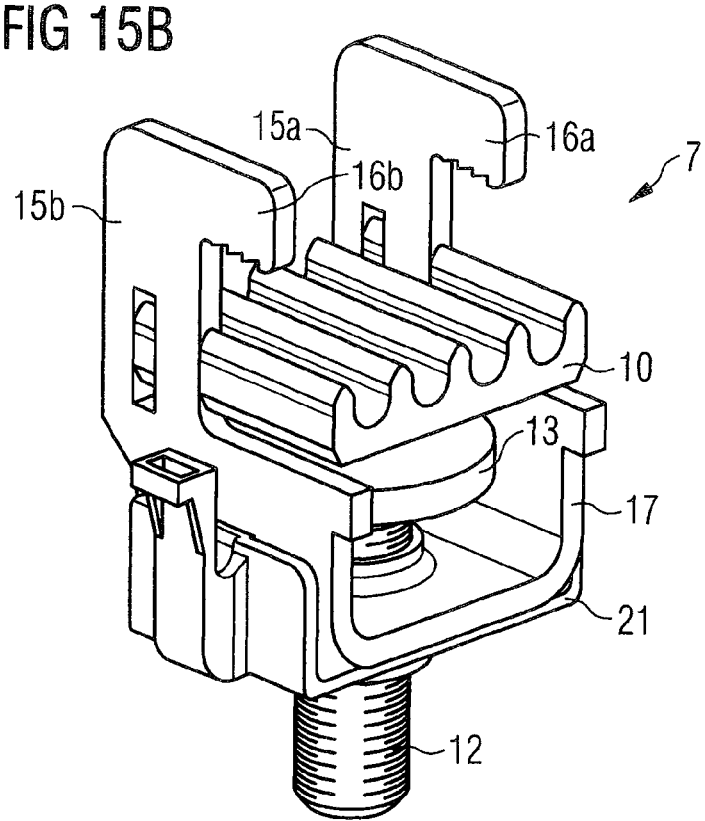

FIGS. 15A, 15B illustrate perspective views of an exemplified embodiment of a connecting terminal 7 obliquely from above and obliquely from below. As can be seen in FIGS. 15A, 15B, the connecting terminals 7 can each comprise a synthetic material clip 21. With the aid of the synthetic material clip 21, the connecting terminals 7 are fixedly held in the switching devices, so that they remain in position when devices are being mounted.

Figure 16A:
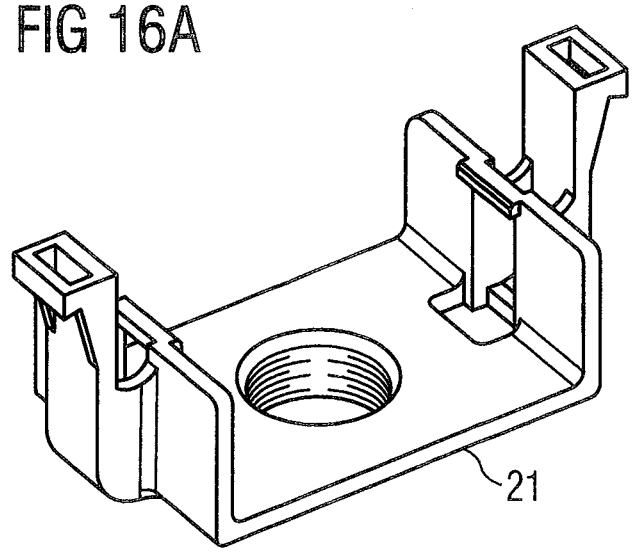
FIG. 16A, 16B show perspective views of components of the connecting terminal illustrated in FIGS. 15A, 15B.
Figure 16B:
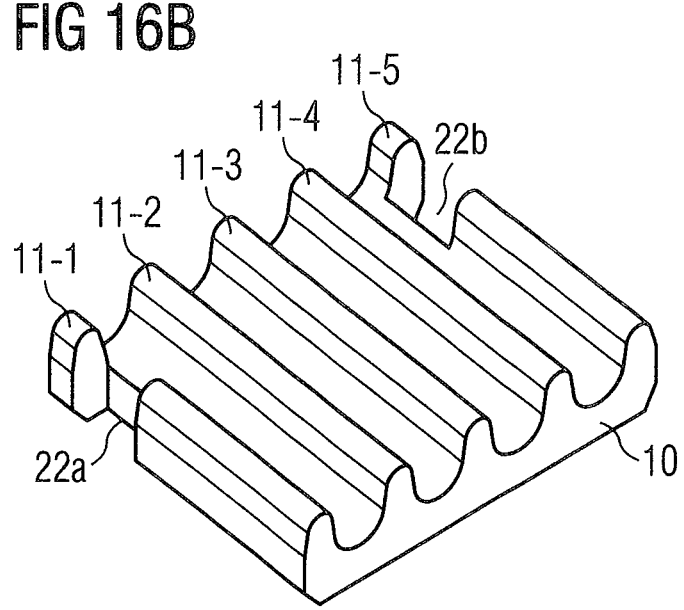

FIGS. 16A, 16B illustrate by way of example components of a connecting terminal 7 used in the contact protection system 1 in accordance with the invention. FIG. 16A shows an exemplified embodiment of a synthetic material clip having an opening for the clamping screw 12. FIG. 16B shows an exemplified embodiment of a contact plate 10 having five contact segments 11-1 to 11-5, wherein recesses 22a, 22b are provided in the outer contact segments 11-1, 11-5, in order to guide the contact plate 10 in the opposite clamping brackets of the connecting terminal 7. For example, the rear portion of the contact segment 11-1 and the contact segment 11-5 are each guided in a guide groove 14a, 14b of an associated clamping bracket 15a, 15b, as illustrated in FIG. 3.

Figure 17A:
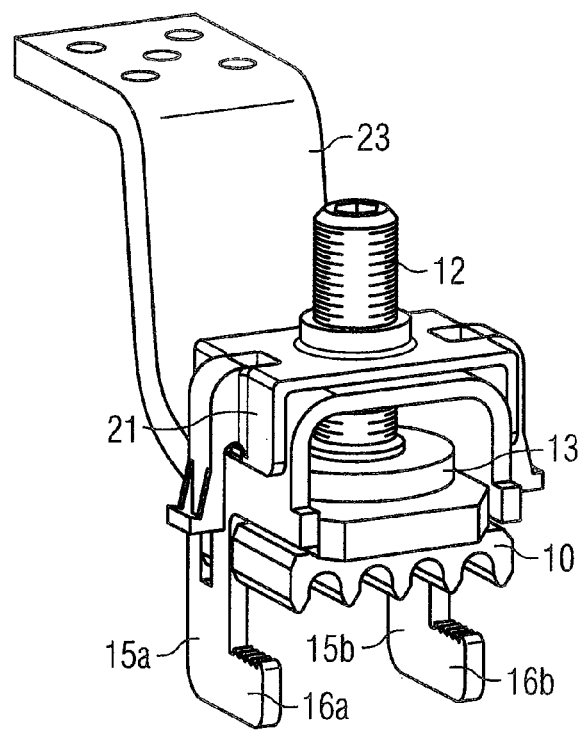
FIG. 17A, 17B show views to illustrate the connection of a connection rail with the aid of a connecting terminal.
Figure 17B:
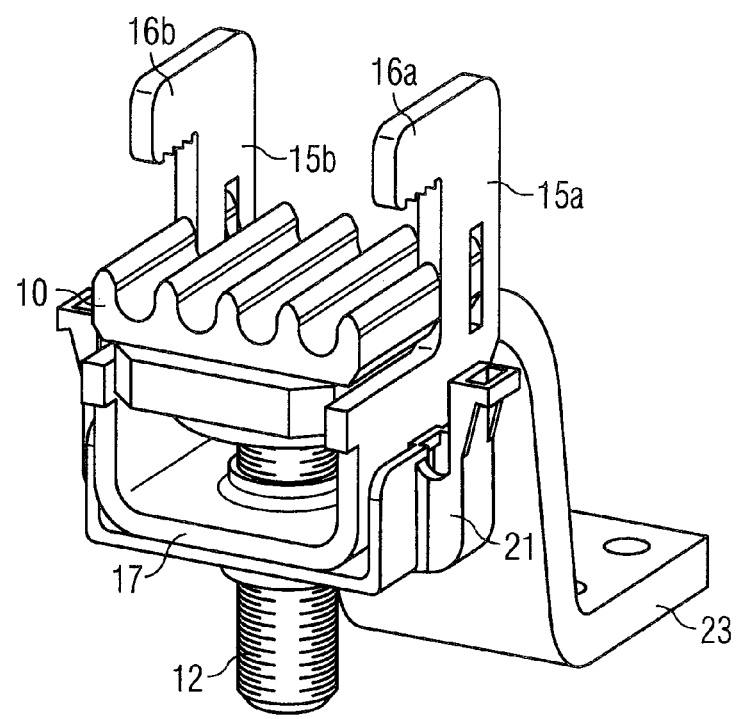

FIGS. 17A, 17B show the possibility of contacting a connection rail 23 with the aid of a connecting terminal 7. As can be seen in FIGS. 17A, 17B, a front region of the bent connection rail 23 is clamped between the spring disk 13 and the contact plate 10. The contact plate 10 can contact a power busbar 9 e.g. through contacting slots of a contact protection module 2. In this manner, the electric current passes via the contacting plate 10 to the connection rail 23. The connection rail 23 can be an integral component of an electric device. The spring disk 13 is preferably resiliently riveted to the clamping screw 12. The clamping brackets 15a, 15b of the connecting terminal 7 which engage behind the power busbar 9 consist e.g. of iron or steel. The current-conducting contacting plate 10 can consist e.g. of copper.

Figure 18A:
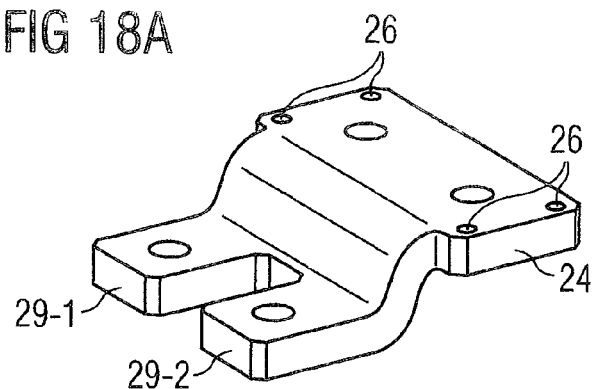
FIG. 18A, 18B, 18C show views to illustrate the mounting of a connecting plate with the aid of connecting terminals in the contact protection system in accordance with the invention.
Figure 18B:
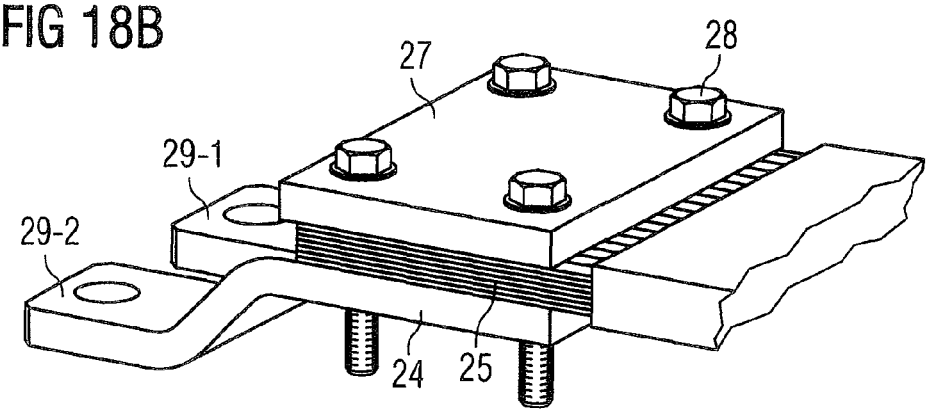
Figure 18C:
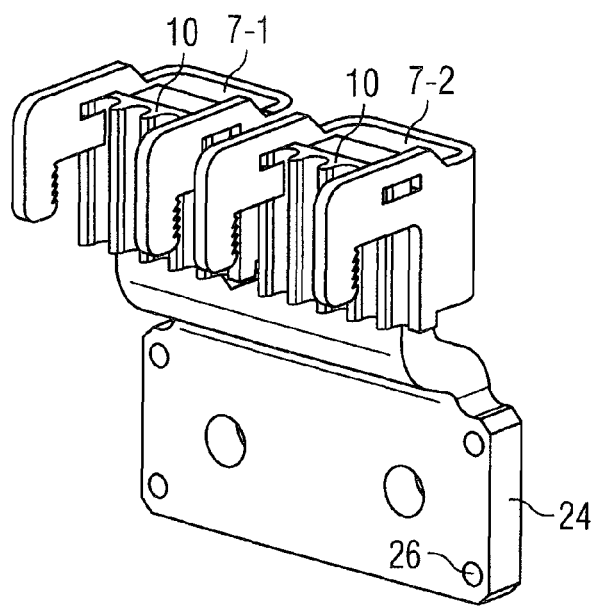

FIGS. 18A, 18B, 18C show the possibility of clamping a connecting plate 24 between the spring disk 8 and the contact plate 10 of the connecting terminal 7. It is thus possible to mount a connecting plate 24 onto the power busbars 9 with the same connecting terminals 7. This connecting plate 24 can also receive a ribbon cable 25, wherein threads 26 can be provided at the plate edge of the connecting plate 24. The ribbon cable 25 is screwed with a second flat plate 27 by means of screws 28 to the connecting plate 24 located underneath. As illustrated in FIG. 18C, it is possible e.g. with the aid of two connecting terminals 7-1, 7-2 to connect two protrusions 29-1, 29-2 of the connecting plate 24 to a power busbar 9 via contact plates 10.

Figure 19A:
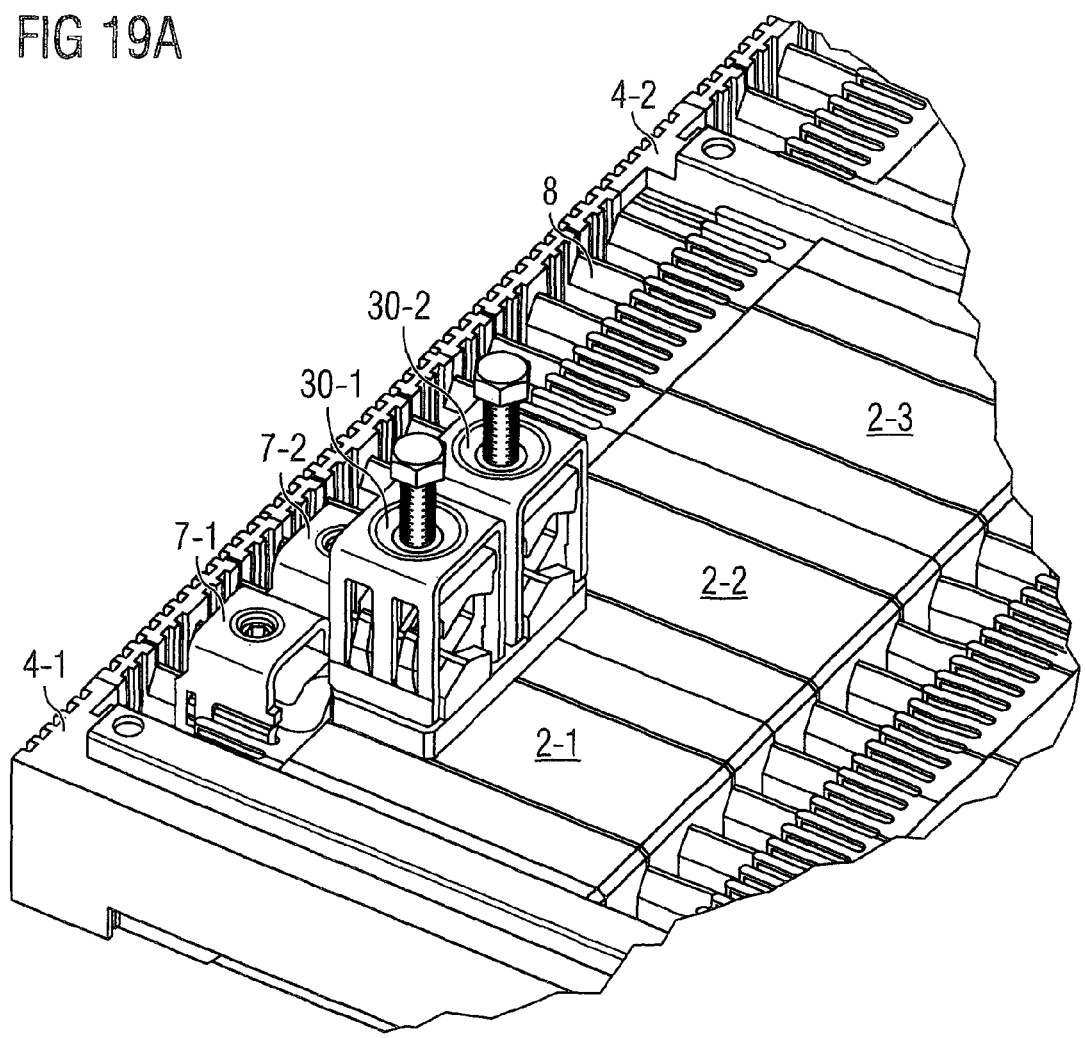
FIG. 19A, 19B show views to illustrate prism clamps for circular and sector-shaped conductors with the aid of connecting terminals in the contact protection system in accordance with the invention.
Figure 19B:
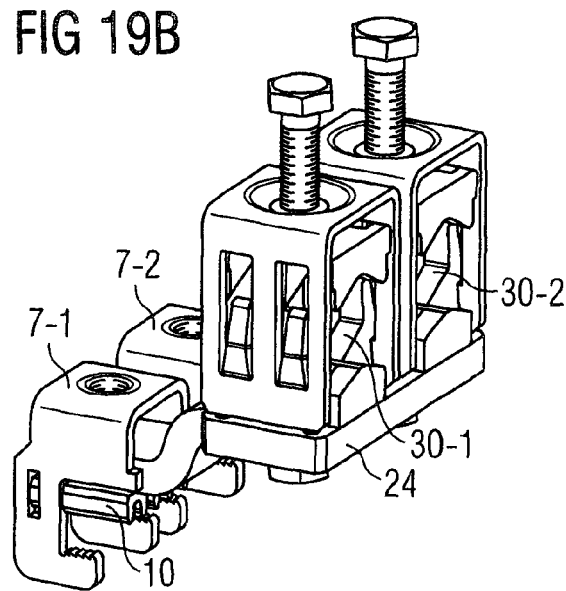

FIGS. 19A, 19B show the possibility of attaching a connecting plate 24 with prism clamps 30-1, 30-2 for circular or sector-shaped conductors. In the case of one embodiment, it is possible to cover the upwardly protruding components, e.g. the prism clamps 30 illustrated in FIGS. 19A, 19B, with an insulating hood in order to ensure additional contact protection.

A major advantage of the contact protection system 1 in accordance with the invention resides in the fact that a switching device can be safely replaced by a user whilst it is still being supplied with voltage. When a device is removed, the contact protection modules 2 preferably provide contact protection in accordance with IP20. The contact protection system 1 is constructed in a modular manner and provides by means of the connecting terminals 7 various ways of connecting different connecting means, e.g. connection rails or prism clamps. By reason of the mechanically stable connecting terminals 7, it is possible to even mount heavy switching devices in a reliable manner on the power busbars 9, wherein this is even possible when the power busbars 9 are being supplied with current. The user is protected by the contact protection system 1, as the contacting slots of the contact protection modules 2 offer protection against direct contact. The contact protection system 1 in accordance with the invention also offers the advantage that existing power busbar systems can be retrofitted in a simple manner with the contact protection system 1 in accordance with the invention. In the case of one possible embodiment of the contact protection system 1 in accordance with the invention, the contact protection modules 2 can be covered and/or closed by an additional, completely closed cover. Furthermore, a covering device for increasing fault arc resistance can be provided or attached to adjacent chambers of the contact protection modules 2. Therefore, the contact protection system 1 in accordance with the invention can be extended in order to avoid fault arcs. The system can also be supplied with the same contacting device including the cover. For example, the contact protection system 1 in accordance with the invention can be designed for different cross-sections of 30 to 120×10 mm.

The invention claimed is:

1. A contact protection system for power busbars having planar contact protection modules which each comprise holding feet for engaging behind the power busbars and latching elements for mutually latching with adjacent contact protection modules,
wherein the contact protection modules comprise for each power busbar a terminal-receiving region for receiving connecting terminals which are provided for electrically contacting the respective power busbar, wherein the terminal-receiving regions of the contact protection modules comprise insertion devices, which are sloped in the manner of a roof, for inserting clamping brackets of the connecting terminals which are provided for fixedly clamping the connecting terminals to the power busbars.

2. The contact protection system as claimed in claim 1, wherein the terminal-receiving regions of the contact protection modules each comprise contacting slots, which are arranged in parallel and offer protection against direct contact, for electrically contacting the power busbars by means of the connecting terminals.

3. The contact protection system as claimed in claim 2, wherein the contacting slots of the terminal-receiving regions are offset from the holding feet in a direction parallel to a width direction of the slot.

4. The contact protection system as claimed in claim 2, wherein the contacting slots of the contact protection modules are formed in such a manner that they provide a uniform division of all mutually latched contact protection modules.

5. A contact protection system for power busbars having planar contact protection modules which each comprise holding feet for engaging behind the power busbars and latching elements for mutually latching with adjacent contact protection modules,
wherein the contact protection modules comprise for each power busbar a terminal-receiving region for receiving connecting terminals which are provided for electrically contacting the respective power busbar,
wherein the connecting terminal comprises a contact plate having contact segments which are arranged in parallel and electrically contact through contacting slots of a contact protection module a power busbar located underneath.

6. The contact protection system as claimed in claim 1, wherein the connecting terminals are each connected to a switching device which draws electric current from the power busbars.

7. The contact protection system as claimed in claim 1, wherein the connecting terminal comprises a contact plate having contact segments which are arranged in parallel and electrically contact through contacting slots of a contact protection module a power busbar located underneath.

8. The contact protection system as claimed in claim 7, wherein the contact plate of the connecting terminal is guided by two opposite guide grooves which are provided in opposite clamping brackets of the connecting terminal.

9. The contact protection system as claimed in claim 7, wherein the contact plate of the connecting terminal is pressed against the power busbar by means of a screw and a spring disk.

10. The contact protection system as claimed in claim 9, wherein a connection rail or a connecting plate can be clamped between the spring disk and the contact plate of the connecting terminal.

11. The contact protection system as claimed in claim 10, wherein at least one prism clamp for a circular and sector-shaped conductor or a ribbon cable is attached to the connecting plate.

12. The contact protection system as claimed in claim 1, wherein busbar carrier cover modules are provided for covering power busbar carriers, wherein the busbar carrier cover modules can be latched to adjacent contact protection modules by means of latching elements.

13. The contact protection system as claimed in claim 1, wherein the contact protection modules can be slid on a plurality of power busbars, which are arranged in parallel in the horizontal direction, such that the holding feet of the contact protection modules engage behind the power busbars.

14. The contact protection system as claimed in claim 13, wherein an edge profile can be inserted at a lower edge of the contact protection modules, which are slid onto the power busbars and are latched to one another, said edge profile can be latched in a non-positive-locking manner to busbar carrier cover modules and therefore the contact protection modules are prevented from inadvertently sliding down from the power busbars.

15. The contact protection system as claimed in claim 1, wherein the contact protection modules can be covered and/or closed by means of an additional, completely closed cover.

16. The contact protection system as claimed in claim 1, wherein each contact protection module of the contact protection system comprises for each power busbar to be covered in each case a plurality of holding feet for engaging behind the respective power busbar,
wherein a cover device for increasing the fault arc resistance can be attached to adjacent chambers of the contact protection modules.

17. The contact protection system as claimed in claim 1, wherein the contact protection modules, the busbar carrier cover modules and edge profiles of the contact protection system consist of an electrically insulating, thermally stable and fire-retarding synthetic material.

18. A contact protection system for power busbars having planar contact protection modules which each comprise holding feet for engaging behind the power busbars and latching elements for mutually latching with adjacent contact protection modules,
wherein the contact protection modules comprise for each power busbar a terminal-receiving region for receiving connecting terminals which are provided for electrically contacting the respective power busbar,
wherein the terminal-receiving regions of the contact protection modules each comprise contacting slots, which are arranged in parallel and offer protection against direct contact, for electrically contacting the power busbars by means of the connecting terminals,
wherein the contacting slots of the contact protection modules are formed in such a manner that they provide a uniform division of all mutually latched contact protection modules.

* * * * *